United States Patent [19]

Sandman et al.

[11] Patent Number: 4,665,133
[45] Date of Patent: May 12, 1987

[54] CHEMICAL MODIFICATION OF SOLID, FULLY CRYSTALLINE POLYDIACETYLENES

[75] Inventors: Daniel J. Sandman, Acton; Boris S. Elman, Allston; Christopher S. Velázquez, Medford, all of Mass.

[73] Assignee: GTE Laboratories Incorporated, Waltham, Mass.

[21] Appl. No.: 751,632

[22] Filed: Jul. 3, 1985

[51] Int. Cl.$^4$ ............................................. C08F 8/22
[52] U.S. Cl. ................................. 525/326.7; 525/356; 526/259
[58] Field of Search ................... 526/259; 525/326.7

[56] References Cited

U.S. PATENT DOCUMENTS 4,125,534 11/1978 Yee ........................ 526/259

FOREIGN PATENT DOCUMENTS 52-151295 12/1977 Japan .

OTHER PUBLICATIONS

Bloor et al., "Molecular Metals", W. E. Hatfield, ed., Plenum Press, New York, 1979.
D. R. Day et al, *J. Appl. Polym. Sci.*, 26, 1605 (1981).
H. Nakanishi et al., *J. Polym. Sci.: Polym. Lett. Edit.*, 21, 983 (1983).
H. Nakanishi et al., *Mol. Cryst. Liq. Cryst.*, 105, 77 (1984).
H. Ohnoma et al., *Macromolecules*, 17, 1285 (1984).
G. N. Patel et al., *J. Macromol. Sci.-Phys.*, 1322, 259 (1983).
N. J. Poole et al., *Mol. Cryst. Liq. Cryst.*, 105, 55 (1984).
D. J. Sandman et al., *Mol. Cryst. Liq. Cryst.*, 106, 199 (1984).
K. Se et al., *Macromolecules*, 16, 1581 (1983); 17, 2126 (1984).
U. Seiferheld et al., *Solid State Communications*, 47, No. 5, 391 (1983).

Primary Examiner—Joseph L. Schofer
Assistant Examiner—Bernard Lipman
Attorney, Agent, or Firm—Martha Ann Finnegan; Frances P. Craig

[57] ABSTRACT

Chemical modification of crystalline poly-1,6-di-(N-carbazolyl)-2,4-hexadiyne is disclosed. There is provided a chlorinated poly-1,6-di-(N-carbazolyl)-2,4-hexadiyne having at least 12 chlorine atoms per repeat unit. The chlorinated poly-1,6-di-(N-carbazolyl)-2,4-hexadiyne of the invention is characterized by a Fourier transform infrared (FTIR) spectrum including peaks at about $745\pm5$, $798\pm5$, and $851\pm5$ cm$^{-1}$. There is also provided a nitrated poly-1,6-di-(N-carbazolyl)-2,4-hexadiyne having at least 2 nitro groups per repeat unit. The nitrated poly-1,6-di-(N-carbazolyl)-2,4-hexadiyne of the invention is characterized by an FTIR spectrum including absorption at about $1511\pm5$, $1342\pm5$, $794\pm5$, $751\pm5$, and $718\pm5$ cm$^{-1}$.

3 Claims, No Drawings

CHEMICAL MODIFICATION OF SOLID, FULLY CRYSTALLINE POLYDIACETYLENES

CROSS-REFERENCE TO RELATED APPLICATION

U.S. patent application Ser. No. 751,631, filed July 3, 1985, by D. J. Sandman and B. S. Elman filed on even date herewith for Chemical Modification of Polydiacetylene Crystals.

BACKGROUND OF THE INVENTION

This invention relates to polydiacetylenes and more particularly to the chemical modification of crystalline polydiacetylenes.

Polydiacetylenes are a class of fully ordered crystalline polymers which are of value as nonlinear optical elements, photoconductors, time-temperature indicators, and photoresists. Good thermal and mechanical properties have also been reported for this class of materials. While certain polydiacetylenes with relatively long side chains may be dissolved in selected solvents, many of the widely studied polydiacetylenes are insoluble. With respect to chemical reactivity of polydiacetylenes with external reagents, relatively little detailed information is available.

Crystalline polydiacetylenes can be prepared from diacetylene compounds by solid state polymerization techniques. The crystallinity of polydiacetylenes is a consequence of their synthesis via lattice controlled solid state polymerization when subjected to thermal or assorted radiative excitations. The polydiacetylenes occupy a key position among organic materials which exhibit phenomena manifesting delocalized interactions due to wide electronic bands. Moreover, polydiacetylenes are often available in processed form.

Beyond structural studies of monomers and polymers, studies of the mechanistic aspects of the polymerization, and the usual spectroscopic studies, only two seminal reports have appeared which show promise of a significant broadening of the scope of polydiacetylene research. They are the report of very high values of the third order nonlinear susceptibility ($\chi^{(3)}$) in single crystal poly-PTS, (bis-p-toluene sulfonate of 2,4-hexadiyne-1,6-diol) with major implications for optical signal processing, and reports of electronic carrier mobilities ($\mu$) comparable to Si and GaAs in single crystals of poly-PTS and poly-DCH (1,6-di-(N-carbazolyl)-2,4-hexadiyne), suggesting potential as novel electronic materials. While the carrier mobilities are indicated to be high, polydiacetylenes are insulators because, following $\sigma = ne\mu$, the number of carriers, n, is extremely low.

Prior to the present invention, controlled chemical modification of crystalline polydiacetylenes, i.e., controlled chemical reactions involving covalent bond formation in crystalline polydiacetylenes, had not been reported.

SUMMARY OF THE INVENTION

The present invention is directed to chemically modified poly-1,6-di-(N-carbazolyl)-2,4-hexadiyne. In accordance with one aspect of the present invention there is provided a chlorinated poly-1,6-di-(N-carbazolyl)-2,4-hexadiyne having at least 12 chlorine atoms per repeat unit, said chlorinated poly-1,6-di-(N-carbazolyl)-2,4-hexadiyne being characterized by a Fourier transform infrared (FTIR) spectrum including absorption at about $745\pm5$, $798\pm5$, and $851\pm5$ cm$^{-1}$.

In accordance with another aspect of the present invention there is provided a method for preparing chlorinated poly-1,6-di-(N-carbazolyl)-2,4-hexadiyne. The method comprises contacting single crystals of poly-1,6-di-(N-carbazolyl)-2,4-hexadiyne with chlorine for a period of time sufficient to form chlorinated poly-1,6-di-(N-carbazolyl)-2,4-hexadiyne having at least 12 chlorine atoms per repeat unit, said chlorinated poly-1,6-di-(N-carbazolyl)-2,4-hexadiyne being characterized by a Fourier transform infrared spectrum including absorption at about $745\pm5$, $798\pm5$, and $851\pm5$ cm$^{-1}$.

In accordance with still another aspect of the present invention there is provided a nitrated poly-1,6-di-(N-carbazolyl)-2,4-hexadiyne having at least 2 nitro groups per repeat unit, said nitrated poly-1,6-di-(N-carbazolyl)-2,4-hexadiyne being characterized by a Fourier transform infrared spectrum including absorption at about $1511\pm5$, $1342\pm5$, $794\pm5$, $751\pm5$, and $718\pm5$ cm$^{-1}$.

In accordance with yet another aspect of the present invention there is provided a method for preparing nitrated poly-1,6-di-(N-carbazolyl)-2,4-hexadiyne. The method comprises contacting single crystals of poly-1,6-di-(N-carbazolyl)-2,4-hexadiyne with fuming nitric acid or fuming nitric acid vapors for a period of time sufficient to form nitrated poly-1,6-di-(N-carbazolyl)-2,4-hexadiyne having at least 2 nitro groups per repeat unit, said nitrated poly-1,6-di-(N-carbazolyl)-2,4-hexadiyne being characterized by a Fourier transform infrared spectrum including peaks at about $1511\pm5$, $1342\pm5$, $794\pm5$, $751\pm5$, and $718\pm5$ cm$^{-1}$.

For a better understanding of the present invention, together with other and further objects, advantages, and capabilities thereof, reference is made to the following disclosure and appended claims.

DETAILED DESCRIPTION OF THE INVENTION

In accordance with the present invention there are provided chemically modified poly-1,6-di-(N-carbazolyl)-2,4-hexadiynes. One aspect of the present invention provides a chlorinated poly-1,6-di-(N-carbazolyl)-2,4-hexadiyne having at least 12 chlorine atoms per repeat unit, the chlorinated poly-1,6-di-(N-carbazolyl)-2,4-hexadiyne being characterized by a Fourier transform infrared spectrum including absorption at about $745\pm5$, $798\pm5$, and $851\pm5$ cm$^{-1}$. Another aspect of the present invention provides a nitrated poly-1,6-di-(N-carbazolyl)-2,4-hexadiyne having at least 2 nitro groups per repeat unit, the nitrated poly-1,6-di-(N-carbazolyl)2,4-hexadiyne being characterized by a Fourier transform infrared spectrum including absorption at about $1511\pm5$, $1342\pm5$, $794\pm5$, $751\pm5$, and $718\pm5$ cm$^{-1}$.

The controlled introduction of either chlorine atoms or nitro groups into the crystal structure of poly-1,6-di-(N-carbazolyl)-2,4-hexadiyne is unexpected because the crystal structure of the polymer is tightly packed and contains no channels. The controlled chemical modification of crystalline poly-1,6-di-(N-carbazolyl)-2,4-hexadiyne by chlorinating or nitrating the carbazole side group on the polydiacetylene backbone produces materials of defined chemical composition.

The chlorinated poly-1,6-di-(N-carbazolyl)-2,4-hexadiyne of the present invention contains at least 12 chlorine atoms per repeat unit of the polymer. The chlorinated carbazole substituted diacetylenic polymer of the present invention is characterized by a Fourier transform infrared spectrum which includes absorption at about 745±5, 798±5, and 851±5 cm$^{-1}$. These peaks are not exhibited by the Fourier transform infrared spectrum of the pristine poly-1,6-di-(N-carbazolyl)-2,4-hexadiyne.

The chlorinated poly-1,6-di-(N-carbazolyl)-2,4-hexadiyne of the present invention is prepared by contacting crystals of poly-1,6-di-(N-carbazolyl)-2,4-hexadiyne with liquid or gaseous chlorine for a period of time sufficient to form the chlorinated poly-1,6-di-(N-carbazolyl)-2,4-hexadiyne of the present invention, having at least 12 chlorine atoms per repeat unit.

The chlorinated poly-1,6-di-(N-carbazolyl)-2,4-hexadiyne of the present invention is an amorphous multiphase material which is partially soluble in selected solvents.

The nitrated poly-1,6-di-(N-carbazolyl)-2,4-hexadiyne of the present invention contains at least 2 nitro groups per repeat unit of the polymer. The nitrated carbazole substituted polydiacetylene of the present invention is characterized by a Fourier transform infrared spectrum including absorption at about 1511±5, 1342±5, 794±5, 751±5, and 718±5 cm$^{-1}$. These absorptions are not exhibited by the Fourier transform infrared spectrum of pristine poly-1,6-di-(N-carbazolyl)2,4-hexadiyne.

The nitrated poly-1,6-di-(N-carbazolyl)-2,4-hexadiyne of the present invention is prepared by contacting crystals of poly-1,6-di-(N-carbazolyl)-2,4-hexadiyne with fuming nitric acid (wt. % HNO$_3 \geq$ 90%.) or the vapors of fuming nitric acid for a period of time sufficient to form the nitrated poly-1,6-di-(N-carbazolyl)-2,4-hexadiyne of the present invention having at least 2 nitro groups per repeat unit. The nitrated carbazole substituted diacetylene polymer of the present invention is a largely amorphous compound.

The capability of a controlled chemical modification of crystalline poly-1,6-di-(N-carbazolyl)-2,4-hexadiyne derives from a side chain assisted process, i.e., a process initially controlled by the energy levels of the side chain group, specifically carbazole, rather than by the energy levels of the conjugated backbone.

The following examples are given to enable those skilled in this art to more clearly understand and practice the present invention. These examples should not be considered as a limitation upon the scope of the present invention but merely as being illustrative and representative thereof.

EXAMPLE 1

Interaction of poly-1,6-di-(N-carbazolyl)-2,4-hexadiyne (Poly-DCH) with Liquid Chlorine Poly-DCH (57.4 mg), prepared from monomer crystallized from N,N-dimethylacetamide, was suspended in liquid chlorine and allowed to stand (23 hours) until the chlorine had evaporated. The resultant orange solid, found to be amorphous by X-ray diffraction, was washed with dichloromethane and extracted with the same solvent to give 107 mg. A 14 mg sample of this material was exposed to hot dimethylformamide; 9.6 mg remained after solvent removal and vacuum drying.

Analysis Found: C, 40.42; H, 1.63; N, 3.01; Cl, 52.54. The observed analysis (normalized to 2N/repeat) corresponds to $C_{31.3}H_{15}N_{2.00}Cl_{13.8}$. The solid state spectrum exhibits a broad maximum at 410 nm.

EXAMPLE 2

Interaction of Poly-DCH with Gaseous Chlorine

Poly-DCH (108.2 mg 0.534 mmol), prepared from monomer crystallized from acetone, was allowed to interact with chlorine gas (72 ml, 3.21 mmol) at room temperature. Sixteen hours later, the color of the chlorine had vanished, and 355.1 mg of material, inhomogeneous on microscope examination, was obtained. The X-ray powder diffraction pattern of this sample revealed the presence of poly-DCH. Hence, only surface reaction occurred.

EXAMPLE 3

Interaction of Poly-DCH with Chlorine Gas

Poly-DCH (65.5 mg) prepared from monomer crystallized from N,N-dimethylformamide, was placed in a one liter three neck flask filled with dense chlorine vapor. After twenty hours at 20° C., the polymer became orange in color and gained 74.7 mg in weight after vacuum drying, corresponding to 13.5 Cl atoms per repeat unit. X-ray powder diffraction of this material revealed it to be largely amorphous except for a weak reflection at d=7.62 Angstroms. The FTIR spectrum of this material revealed at least eight strong absorptions between 1000 and 1500 cm$^{-1}$ and additional strong absorption at 745, 798, and 851$^{-1}$.

EXAMPLE 4

Interaction of Poly-DCH with Chlorine in Dichloromethane

Poly-DCH (49.0 mg) prepared from monomer crystallized from N,N-dimethylformamide, was suspended in dichloromethane (50 mg) at −78° C. Chlorine (ca. 3 ml.) was added to the mixture. The poly-DCH turned bright red-orange and the chlorine color slowly discharged. After 75 minutes, the mixture was allowed to come to room temperature. The red-orange solid isolated after vacuum drying weighed 100.8 mg, a 106% weight gain corresponding to 12.5 Cl atoms/repeat unit. The FTIR spectrum of this material was similar to that given in Example 3. The red-orange solid is partially soluble in chloroform, and is eluted by ethyl acetate in thin layer chromatography on silica gel. Mass spectrometry of the solid extracted revealed that at least six Cl atoms had added to a carbazole group.

EXAMPLE 5

Interaction of Poly-DCH with Aqua Regia

Poly-DCH (81.7 mg), prepared from monomer crystallized from ethyl acetate, was exposed to 40 ml of a 3:1 mixture of concentrated hydrochloric and nitric acids at 0° C. for 29 hours. The material gained 149% in weight, became orange in color, and was amorphous by X-ray powder diffraction.

Analysis: Found: C, 35.87; H, 2.04: N, 3.35, Cl, 52.49. The observed analysis corresponds to a composition of $(C_{30}H_{20}N_{2.4}Cl_{14.9})$.

EXAMPLE 6

Interaction of Poly-DCH with Iodine Monochloride in Carbon Tetrachloride

Poly-DCH (74.6 mg), prepared from monomer crystallized from ethyl acetate, was interacted with iodine monochloride (12.32 g) in carbon tetrachloride (15.79 g) for 18¾ hr. at 20° C. The resultant solid was filtered, washed with dichloromethane, acetone, water, and acetone, and vacuum dried to give 154.4 mg (107% weight gain) of a brown solid. The FTIR spectrum exhibited four strong absorptions between 1100 and 1400 cm$^{-1}$ and additional absorption at about 840, 810, 780, 700, and 640 cm$^{-1}$. The material was amorphous by X-ray diffraction.

Analysis: Found: C, 37.70; H, 0.59; Cl, 43.11; I, 4.67.

EXAMPLE 7

Interaction of Poly-DCH with Fuming Nitric Acid at Room Temperature

Poly-DCH (24.0 mg) prepared from monomer crystallized from N,N-dimethylformamide, was suspended in fuming nitric acid (weight % HNO$_3 \geq$ 90%, 2 ml) at room temperature for two hours during which time the solid sunk. The solid was isolated, washed, and vacuum-dried to give 34.5 mg material, a weight gain of 43.75%. This corresponds to the addition of approximately 3.86-NO$_2$ groups/repeat unit. The FTIR spectrum reveals —NO$_2$ absorption at 1511 and 1342 cm$^{-1}$ and additional relevant absorption at 720, 751, and 796 cm$^{-1}$. X-ray powder diffraction reveals a largely amorphous material with broad reflections at d=11.94, 7.13, and 4.98 Angstroms.

EXAMPLE 8

Interaction of Poly-DCH with Nitric Acid (69-71% by weight)

Poly-DCH (23.3 mg) was added to nitric acid (69-71% HNO$_3$ by weight). Poly-DCH, prepared from monomer crystallized from N,N-dimethylformamide, floated on the liquid and there was no visible change after four hours at room temperature and no weight gain was observed.

EXAMPLE 9

Interaction of Poly-DCH with Nitric Fumes

Poly-DCH (104.4 mg), prepared from monomer crystallized from ethyl acetate, was exposed in a desiccator to the vapors of red fuming nitric acid (5 ml) for 22⅓ hours. After vacuum drying, the material weighed 168.1 mg, a 61% weight gain. X-ray diffraction of this material revealed a major amorphous compound with broad reflections at d=12, 4.82, 3.24, and 3.14A. The FTIR spectrum is similar to that in Example 7.

Analysis: Found: C, 49.42; H, 2.80; N, 12.52. The observed analysis corresponds to C$_{30.0}$H$_{20}$N$_{6.5}$.

The chemical modification of the crystalline poly-1,6-di-(N-carbazolyl)-2,4-hexadiyne starting material in each of the preceding examples occurs throughout the entire lattice of the polymer crystal. Nothing is meant to imply, however, that each side chain with a carbazole on the polydiacetylene backbone is identically modified. However, each repeat unit of the chlorinated polymer does contain at least 12 chlorine atoms and each repeat unit of the nitrated polymer does contain at least 2 nitro groups. Additionally, the chlorinated polymer and nitrated polymer of the present invention, as exemplified by the preceding examples, are chemically modified polymers.

The modified polydiacetylenes of the present invention have a modified electronic structure and hence, modified optical and electrical properties. The ability to controllably modify the optical properties of polydiacetylenes, including the index of refraction, is useful in the fabrication of polydiacetylene optical devices. Additionally, the products of the present invention are partially soluble. This partial solubility provides a specific approach to the processing of polydiacetylenes from macro to microsize elements. Such a processing capability is essential to the ultimate commercial use of polydiacetylene waveguides and other polydiacetylene optical device. An attempt was made to crystallize the amorphous nitrated poly-1,6-di-(N-carbazolyl)-2,3-hexadiyne by heating a 30 mg sample of the nitrated material at about 200° C. Heating the sample at 200° C. rendered the material unstable and highly reactive.

The following examples describe attempts to chemically modify crystalline poly-1,6-di-(N-carbazolyl)-2,4-hexadiyne by contacting the polymer crystals with various reagents, viz., iodine, trifluoroacetic acid, nitrosyl chloride, thionyl chloride, cyanogen bromide, and nitrosyl tetrafluoroborate. The various attempts resulted in either modification of only the surface of the crystals or no detectable reaction.

EXAMPLE 10

Interaction of Poly-DCH with Iodine Vapor

Two samples of poly-DCH crystals, one (21.7 mg), prepared from monomer crystallized in N,N-dimethylformamide, and the second, (21.9 mg) prepared from monomer crystallized from ethyl acetate, were placed in a desiccator with iodine (5.24 gm) at 20° C. for 12¾ days. Both samples retained their pristine appearance and neither sample gained weight.

EXAMPLE 11

Interaction of Poly-DCH with Iodine Liquid

Poly-DCH (0.102 g, 0.25 mmole) prepared from monomer crystals grown in benzene solution, and iodine (0.51 g, 2.0 mmole) were refluxed in an oil bath at 125°-130° for 16 hours. The iodine was removed by washing with ethanol. The poly-DCH had not changed in appearance and no weight gain was observed.

EXAMPLE 12

Interaction of Poly-DCH with Solid Iodine

Poly-DCH (63.4 mg), prepared from monomer crystallized from ethyl acetate, was placed in a beaker and molten iodine (4.5 g) was poured over the polymer crystals and allowed to solidify. After 24 hours in a desiccator at 20° C., the iodine was dissolved in acetone. The recovered polymer was pristine in appearance and no weight gain was recorded.

EXAMPLE 13

Interaction of Poly-DCH and Iodine in Acetic Acid

Poly-DCH (77.6 mg), prepared from monomer crystallized from ethyl acetate, was exposed to iodine (575.7 mg) in glacial acetic acid (30 ml). The mixture was heated and refluxed for 115¼ hours and quenched in water. No weight gain was detected and the material had the appearance of the pristine polymer.

EXAMPLE 14

Interaction of Poly-DCH with Trifluoroacetic Acid

Poly-DCH (119.8 mg), prepared from monomer crystallized from N,N-dimethylformamide, and trifluoroacetic acid (20 ml) were refluxed for 8 days. No weight gain was detected, and the material had the appearance of the pristine polymer.

EXAMPLE 15

Interaction of Poly-DCH with Nitrosyl Chloride Vapor

Poly-DCH (51 mg), prepared from monomer crystallized from ethyl acetate, was exposed to a dense vapor of nitrosyl chloride, prepared as in *Inorganic Synthesis*, Vol. 4, p. 48 (Wiley), for 74¼ hours. The poly-DCH did not change in appearance and no weight gain was detected.

EXAMPLE 16

Interaction of Poly-DCH with Liquid Nitrosyl Chloride

Poly-DCH (52 mg), prepared from monomer crystallized from ethyl acetate, was exposed to liquid nitrosyl chloride (ca. 2 ml.) for 4 hours at $-5°$ C. The poly-DCH did not change in appearance and no weight gain was detected.

EXAMPLE 17

Interaction of Poly-DCH with Thionyl Chloride

Poly-DCH (74 mg, 0.18 mmole), prepared from monomer crystallized from benzene, was stirred magnetically with thionyl chloride (10 ml) at room temperature for 19 hours. No change in appearance was noted, and the mixture was heated at reflux for 24 hours. The material was isolated by suction filtration and washed with dichloromethane. The poly-DCH had not changed in appearance and no weight gain was observed.

EXAMPLE 18

Interaction of Poly-DCH with Cyanogen Bromide Vapor

Poly-DCH (152 mg), prepared from monomer crystallized from ethyl acetate, was exposed to the vapor of cyanogen bromide (3 gms) for 7 days at 20° C. No change in appearance was noted and no weight gain was observed.

EXAMPLE 19

Interaction of Poly-DCH with Nitrosyl Tetrafluoroborate

Poly-DCH (97.1 mg), prepared from monomer crystallized from ethyl acetate, was allowed to interact with nitrosyl tetrafluoroborate (380 mg, 3.3 mmole) in nitromethane (50 ml). There was no hint of reaction after 24 hours at room temperature. The mixture was heated at reflux for 5 days. Examination of the solid isolated after filtration revealed a black layer over pristine poly-DCH.

EXAMPLE 20

Interaction of Poly-DCH with Acetic Anhydride and Boron Trifluoride Etherate Poly-DCH (0.13 mmole), prepared from monomer crystallized from N,N-dimethylformamide, acetic anhydride (8.0 g, 78.4 mmole), and boron trifluoride etherate (157 mmole) were mixed with dichloromethane (25 ml). After 39 days at room temperature, no change in the appearance of the polymer was noted.

EXAMPLE 21

Interaction of Poly-DCH with Sodium Iodide and Iodine

Poly-DCH (75.5 mg), prepared from monomer crystallized from N,N-dimethylacetamide, was suspended in a solution of sodium iodide (7.5 g) in water (50 ml.) saturated with iodine. The mixture was stirred magnetically at room temperature for 69 hours. The polymer had not changed in appearance and no weight gain was recorded.

While there has been shown and described what are at present considered the preferred embodiments of the invention, it will be obvious to those skilled in the art that various changes and modifications can be made therein without departing from the scope of the invention as defined by the appended claims.

What is claimed is:

1. Chlorinated poly-1,6-di-(N-carbazolyl)-2,4-hexadiyne having at least 12 and up to about 15 chlorine atoms per repeat unit, said chlorinated poly-1,6-di-(N-carbazolyl)-2,4-hexadiyne being characterized by a Fourier transform infrared spectrum including absorption at about $745\pm5$, $798\pm5$, and $851\pm5$ cm$^{-1}$.

2. Chlorinated poly-1,6-di-(N-carbazolyl)-2,4-hexadiyne in accordance with claim 1 having between 13 and 14 chlorine atoms per repeat unit and further characterized by an X-ray powder diffraction pattern revealing a largely amorphous material having a weak reflection at d=7.62 angstroms.

3. Chlorinated poly-1,6-di-(N-carbazolyl)-2,4-hexadiyne in accordance with claim 1 having between 12 and 13 chlorine atoms per repeat unit and further characterized by being partially soluble in chloroform.

* * * * *